United States Patent Office 3,338,828
Patented Aug. 29, 1967

3,338,828
PURIFICATION OF WATER SUPPLIES AND
AQUEOUS WASTES
Joseph R. Clark, 1 Majestic S., Lincroft, N.J. 07738
No Drawing. Filed July 29, 1964, Ser. No. 386,059
10 Claims. (Cl. 210—52)

The invention relates to the purification of water and aqueous wastes with novel treating agents for the clarification of the same.

Most potable waters and non-potable waters used for industrial purposes are clarified to remove substances which impart turbidity and objectionable color to the water. These substances are mainly non-settling, colloidal silt and clay and minute forms of organic matter, plant life and micro-organisms usually found in surface waters such as lakes, rivers, streams, etc. The colloidal silt particles are a major problem because they are present at all times and are present in high concentrations at certain times due to heavy rains, melting snow, high winds, etc.

Under certain conditions where the concentrations of these objectionable materials do not exceed low limits, fairly effective removal may be effected by slow sand filtration alone. However, coagulation is essential where removal of turbidity, organic color and bacteria is the main object of the treatment. In certain water treating plants, where additional treatment such as pre-chlorination, removal of tastes and odors with activated carbon, post-chlorination, etc., are required, coagulation will materially aid these operations.

In water treatment terminology, a coagulant is defined as an agent added to water to facilitate the settling out of colloidal or finely divided suspended matter. Coagulation is the treatment process which refers to a series of chemical and mechanical operations by which the coagulants themselves are applied and made effective. These operations are commonly divided into two distinct phases, i.e. mixing wherein the dissolved coagulant is rapidly dispersed throughout the water to be treated, usually accompanied by agitation, and floccuation, which involves agitation of the water at somewhat lower velocities for a much longer period of time, during which the very small particles grow and agglomerate into well-defined hydrated flocs of sufficient size to promote rapid settling. The broad term clarification is generally used to include both coagulation and sedimentation or settling out. For convenience, I define the water-soluble conventional coagulants as "common" coagulants.

The most widely used coagulants are aluminum or iron salts of either sulfuric or hydrochloric acid. Aluminum sulfate, $Al_2(SO_4)_3$ (sometimes designated as filter alum), is still the most widely used coagulant. Ferrous sulfate, $FeSO_4 \cdot 7H_2O$ (known as copperas), is also used to a great extent. Ferric sulfate, $Fe_2(SO_4)_3$ sometimes known as "ferrifloc" or "ferrisul"), ferric chloride, $FeCl_3 \cdot 6H_2O$, and sodium aluminate, $Na_2Al_2O_4$, are also employed as coagulants.

The chemical reactions which occur during coagulation are somewhat complex, and involve not only the direct union to the coagulant ions with impurities in the water, but they also involve the formation of hydrous oxides. For example, the reaction of aluminum sulfate may be shown as follows:

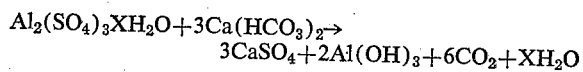

$$Al_2(SO_4)_3 \cdot XH_2O + 3Ca(HCO_3)_2 \rightarrow$$
$$3CaSO_4 + 2Al(OH)_3 + 6CO_2 + XH_2O$$

In this equation it will be noted that the aluminum sulfate reacts with the naturally occurring alkalinity of the water (shown as calcium bicarbonate, $Ca(HCO_3)_2$). The hydrous oxide, $Al(OH)_3$, is the floc which ultimately precipitates and removes the objectionable contaminants from the water.

The amount of coagulant required to completely free a water of turbidity will vary greatly from as little as 1 or 2 parts per million to more than 100 parts per million. The exact quantity of coagulant can usually be determined only by trial and error. The amount even thus determined will vary wth other factors such as time of mixing, water temperature, etc. For example, the minimum quantity of coagulant determined to be effective in producing good flocculation in a given water would generally require a fairly long mixing time varying from 15 to 30 minutes in the summer and from 30 to 60 minutes in the winter when water temperatures approach the freezing point. Very finely divided suspended matter is more difficult to coagulate than the coarser particles, necessitating a larger amount of coagulant for a given turbidity. The character of the water also has considerable influence on the pH value at which satisfactory flocs may be formed. In some waters, it may be quite difficult to obtain good coagulation with alum at a pH of 7.5 whereas in other waters, especially those high in calcium bicarbonate, excellent coagulation may be obtained at a pH of 8.5 or even higher. Generally speaking, it has been found that natural waters need pH adjustment towards either the acid or alkaline side of 7 to obtain efficient and economical coagulation.

Although it is not necessary to discuss at great length the mechanism of fluocculation, it should be pointed out that in the promotion of growth of the floc particles, flocculation depends both upon physical action, particularly agitation of the water and adhesion of the turbidity-producers, as well as upon those chemical or electronic forces which exert a material effect upon the physical action. The physical action in the flocculation phase of coagulation is accomplished either by mechanical devices, called flocculators, or by a system of baffles in the mixing basin whereby the high mixing velocities are gradually reduced to a point where floc already formed in the mixing phase will not be broken up but will be maintained in suspension. The coagulation period will vary considerably from plant to plant. Generally speaking, the majority of water plants operate on a 10 to 30 minute coagulation period with the broad range being from 3 to 90 minutes.

Although it is sometimes possible to obtain satisfactory flocculation by the use of a single "common" coagulant as previously defined, many waters require a more complex type of treatment. A number of materials not per se considered coagulants have been found to possess properties which aid the coagulant in the performance of its function. These are denominated coagulant aids. Broadly speaking, alkalies such as lime and soda ash, or acids such as sulfuric, hydrochloric, and phosphoric acid may be considered coagulant aids. Sodium silicate partially neutralized with dilute sulfuric acid and known as "activated silica" is a coagulant aid.

In addition to the commonly used coagulants such as alum, copperas, and the like, certain highly colloidal clays of the swelling bentonite type have been used for clarification. These clays are produced generally in the vicinity of the Black Hills of Wyoming and South Dakota and they are capable of forming thick gels many times the volume of the original bentonite when added to water. They are sometimes denominated as "sodium bentonites," and their use for water purification purposes is fully described in U.S. Patents 2,345,827 and 2,362,022.

The use of a bentonitic clay and an organic polyelectrolyte as a coagulant aid is known to increase the coagulating efficiency of known coagulants.

It is an object of the invention to provide a novel treatment of water and aqueous wastes which effects more rapid coagulation, settling and clarification which reduces treatment plant size.

It is another object of the invention to provide an improved coagulant aid.

It is another object of the invention to provide novel coagulation treatment processes with more economical amounts of coagulant and coagulant aids.

It is a further object of the invention to provide a novel treatment of water and aqueous wastes with improved removal of tastes, odors and colors.

These and other objects and advantages of the invention will become obvious from the following detailed description.

The novel process of the invention for clarifying water and aqueous wastes comprises adding to the water or aqueous wastes a water-soluble inorganic coagulant and small amounts, i.e. 1 to 75 p.p.m., of fly ash, particularly electrostatically precipitated, or electrostatically charged fly ash which forms a floc and separating a clarified water from said floc.

The fly ash may be used in larger amounts, i.e. up to 100 p.p.m. depending upon the aqueous material being treated, the particular polyelectrolyte used and the degree of clarification desired, but above 50 p.p.m., a residual turbidity frequently appears. When treating raw water, 2 to 15 p.p.m. of fly ash is preferably used and when treating supernatent sewage, approximately 40 to 50 p.p.m. is usually preferred.

Fly ash as referred to herein describes the ash residue remaining from the combustion or partial combustion of carbonaceous materials, particularly fossil fuels such coal and lignite as removed by Cottrell precipitation or other electrostatic processes or by off-gas filtration and is to be distinguished from fly ash recovered by inertial means such as cyclone separators which is of limited value. However, mechanically removed fly ash or clays in general, including bentonite may be added to act as weighting agents.

A particularly preferred embodiment of the invention comprises adding to the water or aqueous wastes a water-soluble inorganic coagulant, an organic polyelectrolyte coagulant aid and small amounts of electrostatically precipitated or electrostatically charged fly ash to form a large floc rapidly and separating a clarified water therefrom.

The organic polyelectrolyte fly ash coagulant aid of the invention gives more rapid coagulation and larger floc buildup which results in more rapid floc settling velocities. For example, coagulation and floc settling times have been reduced as much as 90% with the novel process of the invention as compared to the use of the coagulant alone. This permits a reduction of the treatment plant size or conversely increases the capacity of a standard size treatment plant and therefore reduces the capital investment. Another advantage of the coagulant aids of the invention is that less coagulant and organic polyelectrolyte is required which reduces the cost of the treatment. Fly ash is usually a waste product and is therefore very inexpensive.

The order of addition of the fly ash, organic polyelectrolyte and the coagulant is not critical and may usually be made in any order. However, best results are usually obtained if all of the said products are added at approximately the same time.

Polyelectrolytes and the present state of the art are defined by Betz Handbook of Industrial Water Conditioning, 6th Ed., 1962, as follows: "Polyelectrolytes are high molecular weight water soluble polymers that contain groups capable of undergoing electrolytic dissociation to give a highly charged, large molecular weight ion. Originally, the term was applied only to synthetic polymers or copolymers but has become more inclusive through general use. The term now includes naturally occurring organic flocculents many of which function through hydration alone rather than through electrolytic activity. In some cases, the term is applied to combination of natural organic flocculents and inorganic weighting agents.

"Polyelectrolytes are further classified as anionic, cationic or nonionic. Polymers whose functional groups in water solution give positively charged particles are cationic. Polymers that dissociate to form negatively charged ions are called anionic. Polymers in the nonionic group provide both positive and negative charges in solution.

"The mechanisms of the aids are not completely understood but a great deal of research is being done in order to develop further knowledge of this function. Such factors relating to colloidal behavior as Zeta potential, Brownian movement, Van Der Walls forces and electrophoretic mobility are being studied to determine a more scientific approach to the selection of coagulants and coagulant aids. At the present time the most dependable tool for checking out a system of coagulants is the well-known jar test . . . ."

The use of the word "polyelectrolyte" in the description of the present invention refers to the broad definition quoted above from the Betz Handbook, with the further extension to include inorganic polymeric coagulant aids such as activated silica.

In the context of the reference in the foregoing discussion from the Betz Handbook regarding "inorganic weighting agents," a distinction is made between electrostatically removed fly ash, and that collected inertially, such as in cyclone separators. The use of electrostatically removed fly ash in co-action with polyelectrolytes results in more rapid formation of larger, stronger floc, whereas the similar use of fly ash collected by cyclone separators results in a mere "weighting action," which is of limited value.

Examples of suitable polyelectrolytes which are particularly effective are water soluble cellulose derivatives such as hydroxyethyl cellulose, carboxymethyl cellulose, hydroxyethyl carboxymethyl cellulose, modified starches, starch ethers, polysaccharides such as Carragheen, guar gum, pectin, glue, water soluble polyacrylamides, hydrolyzed water soluble polyacrylamides having an average molecular weight of at least 10,000, polyethylene oxides, etc.

In the following examples there are described several preferred embodiments to illustrate the invention. However, it should be understood that the invention is not intended to be limited to the specific embodiments.

*Example I*

Simultaneous tests were made by using one liter water samples in laboratory test jars with a multiple speed stirrer. After addition of the coagulant, the fly ash and the organic polyelectrolyte, the size of the floc formed and the time of formation of the floc were determined and compared with the floc formed using the coagulant and organic polyelectrolyte alone. The floc size was rated according to the following scale.

| | Mm. |
|---|---|
| Very small | <1 |
| Small | 1 |
| Medium small | 1.5 |
| Medium | 2 |
| Medium large | 2.5 |
| Large | 3 |
| Very large | >3 |

The results of the tests are summarized in Table I. The coagulant was ferric sulfate at a concentration of 1.7 grains per gallon of water.

TABLE I

| Coagulant Aid, p.p.m. | Fly Ash, p.p.m. | Size of Floc | Formation time, min. |
|---|---|---|---|
| 1.0—11-7 | | Medium large | 3 |
| 0.2—11-7 | 15 | Large | 5 |
| 4.0—Cellosize | | Medium large | 8 |
| 2.0—Cellosize | 15 | do | 6 |
| 0.2—Magnifloc | | Medium | 8 |
| 0.1—Magnifloc | 15 | Medium large | 5 |
| Do | 15 | do | 3 |
| 4.0—CMC | | Medium | 5 |
| 1.0—CMC | 15 | Medium large | 5 |
| 5.0—Hagon 18 | | Medium small | 6 |
| 1.0—Hagon 18 | 15 | Medium large | 6 |
| 2.1—Sodium Alginate | | Medium | 3 |
| 1.0—Sodium Alginate | 15 | Large | 3 |
| 2.0—Carragheen | | Medium | 5 |
| Do | 15 | Medium large | 5 |
| 4.0—Burtonite 78 | | Medium | 5 |
| Do | 15 | Large | 3 |
| 1.0—Burtonite 78 | 15 | do | 5 |
| 10.0—Wisprofloc | | Large | 3 |
| 5.0—Wisprofloc | 15 | do | 3 |
| None | | Very small | 5 |
| | | Small | 15 |

CMC—Low viscosity sodium carboxymethyl cellulose.
11-7—Synthetic Polyelectrolyte.
Cellosize—Hydroxyethyl cellulose.
Hagon 18—Bentonite + polyelectrolyte, Hagon Corp.
Burtonite 78—Guar gum.
Wisprofloc—Modified starch.

The data of Table I clearly shows that the addition of small amounts of electrostatically charged fly ash gives a larger floc in a shorter time than without the fly ash. Also smaller amounts of the coagulant aid may be used which results in more economical operation.

*Example II*

Using the procedure of Example I, the following results were obtained with water at 39° F. using alum as the coagulant.

TABLE II

| Alum Grains per Gallon | Coagulant Aid, p.p.m. | Fly Ash, p.p.m. | Size of Floc | Formation time, min. |
|---|---|---|---|---|
| 1.3 | 5.0—Hagon 18 | | Very small | 15 |
| 1.3 | 1.0—Hagon 18 | | Slight improvement | 15 |
| 1.3 | do | 15 | Medium | 5 |
| 1.3 | 0.1—CMC-High Visc | | Small | 15 |
| 1.3 | do | 15 | Medium | 5 |
| 1.3 | 1.0—Anionic 11-7 | | Medium large | 15 |
| 1.3 | do | 15 | Medium | 6–7 |
| 1.3 | 3.0—Anionic 11-7 | 15 | Large | 10 |
| | | | do | 4–5 |

*Example III*

The procedure of Example I was again used using 1.9 grains per gallon ferric sulfate as the coagulant with the exception that the floc size was noted at 5 minutes and then the stirrer speed was reduced to below 20 r.p.m. for 5 minutes. The results are summarized in Table III.

TABLE III

| Coagulant Aid, p.p.m. | Fly Ash, p.p.m. | At 30 r.p.m. | | Below 20 r.p.m. | |
|---|---|---|---|---|---|
| | | Floc Size | Formation time | Floc Size | Formation time |
| None | | Small | 4 | Medium | 5 |
| 10.0—Hagon 18 | | Medium | 3 | Very large | 5 |
| 2.0—Hagon 18 | 15 | Medium large | 3 | Large | 5 |
| 1.0—Anionic 11-7 | | Small / Medium | 2–3 / 5 | Very large | 5 |
| Do | 15 | Medium / Large / Very large | 1 / 3 / 5 | do | 5 |
| 0.3—Anionic 11-7 | 15 | Small / Large | 1 / 5 | Large | 5 |

Example IV

Using the procedure of Example I, the results of Table IV were obtained with water having a pH of 7.1 and a water temperature of 39° F. using ferric sulfate as the coagulant.

TABLE IV

| Ferric Sulfate, Gr./Gal. | Coagulant Aid, p.p.m. | Fly Ash, p.p.m. | Size of Floc | Formation time, min. |
|---|---|---|---|---|
| 1.7 | | | Very small | 5 |
| | | | Medium | 10 |
| 1.9 | | | Small | 4 |
| | | | Medium | 10 |
| 1.9 | 8.0—Wisprofloc | | Large | 3 |
| 1.9 | do | 15 | do | 3 |
| 1.9 | do | | None | 5 |
| 1.5 | 6.0—Wisprofloc | 15 | Medium large | 5 |
| 1.5 | 10.0—Wisprofloc | | Large | 3 |
| 1.7 | 5.0—Wisprofloc | 15 | do | 3 |
| 1.7 | 4.0—Butonite 78 | | Medium | 5 |
| 1.7 | do | 15 | Very large | 5 |
| 1.7 | 1.0—Butonite 78 | 15 | Large | 5 |
| 1.7 | 2.0—Sodium Alginate | | Medium | 3 |
| 1.7 | 1.0—Sodium Alginate | 15 | Large | 3 |
| 1.7 | 2.0—Carragheen | | Medium | 5 |
| 1.7 | do | 15 | do | 3 |
| | | | Medium large | 5 |
| 1.7 | 0.5 Carragheen | 15 | Medium | 5 |
| 1.7 | 0.2—Magnifloc | | do | 5 |
| | | | Large | 8 |
| 1.7 | 0.1—Magnifloc | 15 | do | 3 |
| | | | Very large | 5 |
| 1.7 | 4.0—Cellosize | | Medium | 4 |
| | | | Medium large | 8 |
| 1.7 | 2.0—Cellosize | 15 | Medium large | 3 |
| | | | Large | 6 |
| 1.7 | 4.0—CMC-low Visc | | Medium | 5 |
| 1.7 | 1.0—CMC-low Visc | 15 | Medium | 3 |
| | | | Medium large | 5 |
| 1.7 | 1.0—CMC-low Visc. plus 15 p.p.m. Isnec 200. | 15 | Medium | 3 |
| | | | Medium large | 5 |
| 1.7 | 1.0—Anionic 11-7 | | Medium | 3 |
| | | | Large | 8 |
| | | | Medium large | L3 |
| 1.7 | do | 15 | Large | 5 |
| | | | Very large | 8 |
| | | | Medium large | 4 |
| 1.7 | 0.2—Anionic 11-7 | 15 | Large | 5 |
| | | | Very large | 8 |
| 1.7 | 5.0—Hagon 18 | | Medium small | 6 |
| 1.7 | 1.0—Hagon 18 | 15 | Medium large | 6 |
| | | | Medium large | 2 |
| 1.7 | 3.0—UCAR 149 | | Large | 3 |
| | | | Medium large | 2 |
| 1.7 | 1.0—UCAR 149 | 15 | Large | 3 |
| | | | Medium | 2 |
| 1.7 | 0.2—Anionic 7-11 | 15 | Large | 5 |
| 1.7 | do | 15 | Medium large | 5 |
| 1.7 | 1.0—UCAR 149 | | Very small | 2 |
| | | | Medium | 5 |
| 1.7 | 0.5—UCAR 149 | 15 | Medium small | 2 |
| | | | Medium large | 5 |
| 1.7 | 0.2—UCAR 149 | 15 | Medium small | 2 |
| | | | Medium large | 5 |

Example V

Using the procedure of Example I, sewage plant effluent was treated with 2.5 grains per gallon of ferric sulfate as the coagulating agent. The results are summarized in Table V.

TABLE V

| Coagulant Aid, p.p.m. | Fly Ash, p.p.m. | Size of Floc | Formation time, min. |
|---|---|---|---|
| 1.5—Magnifloc 990 | | Medium | 2 |
| | | Large | 4 |
| Do | 45 | Large | 2 |
| | | Very large, 4 mm | 3 |
| | | Ultrafine L, ¼ mm. | 3 |
| 1.5—UCAR 149 | | Very small | 8 |
| 1.5—UCAR 149 | 45 | Very small | 3 |
| | | Medium | 6 |

Example VI

Using the procedure in Example I, sewage plant effluent (different sewage than in Example V) was treated with 2.8 grains per gallon of ferric sulfate as the coagulating agent. The results are summarized in Table VI.

TABLE VI

| Ferric Sulfate grains per gal. | Coagulant Aid, p.p.m. | Fly Ash, p.p.m. | Size of Floc | Formation time, min. |
|---|---|---|---|---|
| 2.8 | 2.0—Sodium Alginate | | Medium, 2 mm | 2 |
| 2.8 | ----do---- | 45 | ----do---- | 1 |
| 2.8 | 2.0—Magnifloc 990 together with 2.0—UCAR 149. | | Large floc, 3 mm | 3 |
| 2.8 | 2.0—Magnifloc 990 together with 2.0—UCAR 149. | 45 | Very large floc, 4 mm | 2 |
| 2.5 | 1.5—Magnifloc 990 | | Medium, 2 mm | 3 |
| 2.5 | ----do---- | 45 | Large, 3 mm | 2 |
| 2.5 | 1.5—UCAR 149 | | Fine, less than 1 mm | 8 |
| 2.5 | 1.5—UCAR 149 | 45 | Medium, 2 mm | 6 |

Example VII

Using the same procedure as in Example I, meat packing plant waste was treated using 4 grains per gallon of ferric sulfate as coagulating agent. The results were as shown in Table VII. Floc volumes were for 1000 ml. samples of the waste.

TABLE VII

| Coagulant Aid, p.p.m. | Fly Ash, p.p.m. | Size of Floc | Formation time, min. | Floc volume at 8 min., ml. | Supernatent Clarity at 8 min. |
|---|---|---|---|---|---|
| 2.0—Sodium alginate | | Small | 8 | 80 | Cloudy. |
| Do | 45 | Medium large, 2.5 mm | 7 | 60 | Very clear. |
| 2.0—Magnifloc 990 | | | | 110 | |
| Do | 45 | | | 90 | |

Example VIII

Using the same procedure as in Example I, a highly colored textile waste containing dissolved and suspended organic materials was treated using 6 grains per gallon of ferric sulfate as coagulating agent. The results were as shown in Table VIII.

TABLE VIII

| Coagulant Aid, p.p.m. | Fly Ash, p.p.m. | Size of Floc | Formation time, min. |
|---|---|---|---|
| 4.0—UCAR 149 together with 4.0—Magnifloc 990. | | Less than 1 mm | 15 |
| 4.0—UCAR 149 together with 4.0—Magnifloc 990. | 100 | 2.5 mm | 15 |

Various modifications of the process of the invention may be made without departing from the spirit or scope thereof and it is to be understood that the invention is to be limited only as defined in the appended claims.

I claim:

1. In the process of clarifying potable water supplies, aqueous wastes and aqueous process streams by contacting said water with a primary water-soluble inorganic coagulant, and coagulant aid in order to form a floc and separating said water from said floc, the improvement which comprises utilizing a coaction of from 1 to 100 parts per million, based on the amount of water, of fly ash and at least one organic polyelectroylte as said coagulant aid.

2. The process of claim 1 wherein said fly ash is electrostatically-precipitated fly ash.

3. A process for the formation of floc of superior size, strength and settling characteristics and more rapid floc growth in potable water, domestic sanitary sewage, aqueous industrial wastes and aqueous process streams which comprises the steps of adding to said water a primary water-soluble inorganic coagulant, at least one organic polyelectrolyte coagulant aid and electrostatically-precipitated fly ash and agitating said water until said floc is formed.

4. The process of claim 3 wherein said primary coagulant is added in amounts normally utilized and about from 1 part per billion to 100 parts per million of organic polyelectrolyte coagulant aid and from about 2 parts per million to 100 parts per million of electrostatically-precipitated fly ash are utilized.

5. A process of clarifying potable water containing dissolved, suspended and colloidal materials which comprises contacting said water with an effective amount of a water-soluble inorganic coagulant selected from the group consisting of aluminum sulfate, ferric chloride, ferric sulfate, ferrous sulfate and sodium aluminate, at least 0.01 part per million of an organic polyelectrolyte which is capable of increasing the flocculation rate and the capacity of the water-soluble coagulant to absorb and adsorb said dissolved, suspended and colloidal materials, said polyelectrolyte being selected from the group consisting of water-soluble cellulose derivatives, water-soluble polyacrylamides, hydrolyzed water-soluble polyacrylamides, polysaccharides, pectins, glues, Carragheen, alginic acid and its derivatives, guar, natural and modified starches, starch-ethers, and salts thereof having a molecular weight of at least 10,000, and from about 1 part per million to about 100 parts per million of an electrostatically-precipitated fly ash, for a length of time sufficient to form a floc and separating a purified water from said floc.

6. A process for increasing the capacity of conventional water treatment plants utilizing clarification by floc formation which comprises forming said floc in the water being treated by coacting a primary water-soluble inorganic coagulant, at least one water-soluble organic polyelectrolyte and an electrostatically-precipitated fly ash.

7. A process for improving the filtrability of aqueous streams containing solid suspensions which comprises forming a floc therein by the coaction of a primary water-soluble inorganic coagulant, at least one water-soluble organic polyelectrolyte and an electrostatically-precipitated fly ash.

8. A process for reducing the color, turbidity, taste and odor and increasing the purity of aqueous streams which comprises the steps of forming a floc in said streams by the coaction of a primary water-soluble inorganic coagulant, at least one water-soluble organic polyelectrolyte and an electrostatically-precipitated fly ash and separating a purified water from said floc.

9. A process of purifying impure potable water, sewage, industrial wastes, and process streams, which comprises adding thereto an aqueous suspension of a pre-formed floc produced by the coaction in water of a primary water-soluble inorganic coagulant, at least one water-soluble organic polyelectrolyte and an electrostatically-produced fly ash, filtering said impure water containing said pre-formed floc through a sludge blanket and recovering a purified water stream.

10. In the process of clarifying potable water, aqueous wastes and aqueous process streams by the formation of floc in the unclarified water and separating said floc from said clarified water, the improvement which comprises the coaction of electrostatically-precipitated fly ash and at least one organic polyelectrolyte in said formation of floc.

References Cited

UNITED STATES PATENTS

| | | | |
|---|---|---|---|
| 2,663,453 | 3/1953 | McAllister | 210—20 |
| 2,926,137 | 2/1960 | Calvert | 210—500 |
| 2,964,466 | 12/1960 | Farnham | 210—52 |
| 3,142,638 | 7/1964 | Blaisdell et al. | 210—52 |
| 3,171,801 | 3/1965 | Rice et al. | 210—52 |
| 3,226,319 | 12/1965 | Schick | 210—52 |
| 3,235,492 | 2/1966 | Andresen et al. | 210—52 |

OTHER REFERENCES

Rudolfs, W.: Concentration of Activated Sludge etc., Sewage Works Journal, July 1943, vol. 15, pp. 642–657 (P.O.S.L.).

MORRIS O. WOLK, *Primary Examiner.*

MICHAEL E. ROGERS, *Assistant Examiner.*